June 26, 1956
D. CAMPBELL
2,751,754
POWER DAM SLUICEWAY GATE
Filed Feb. 17, 1953
10 Sheets-Sheet 1
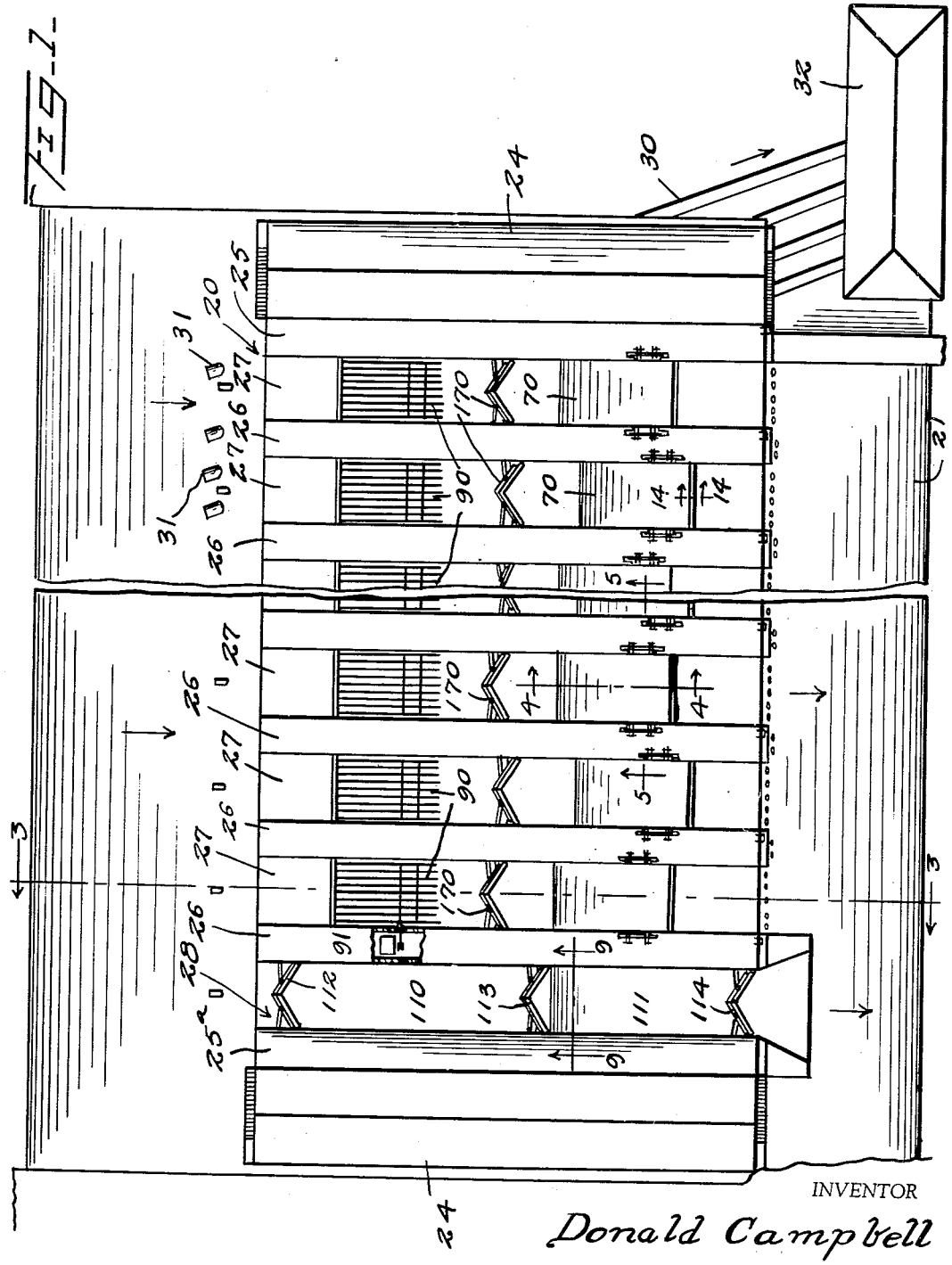
INVENTOR
Donald Campbell
BY Kimmel & Crowell
ATTORNEYS

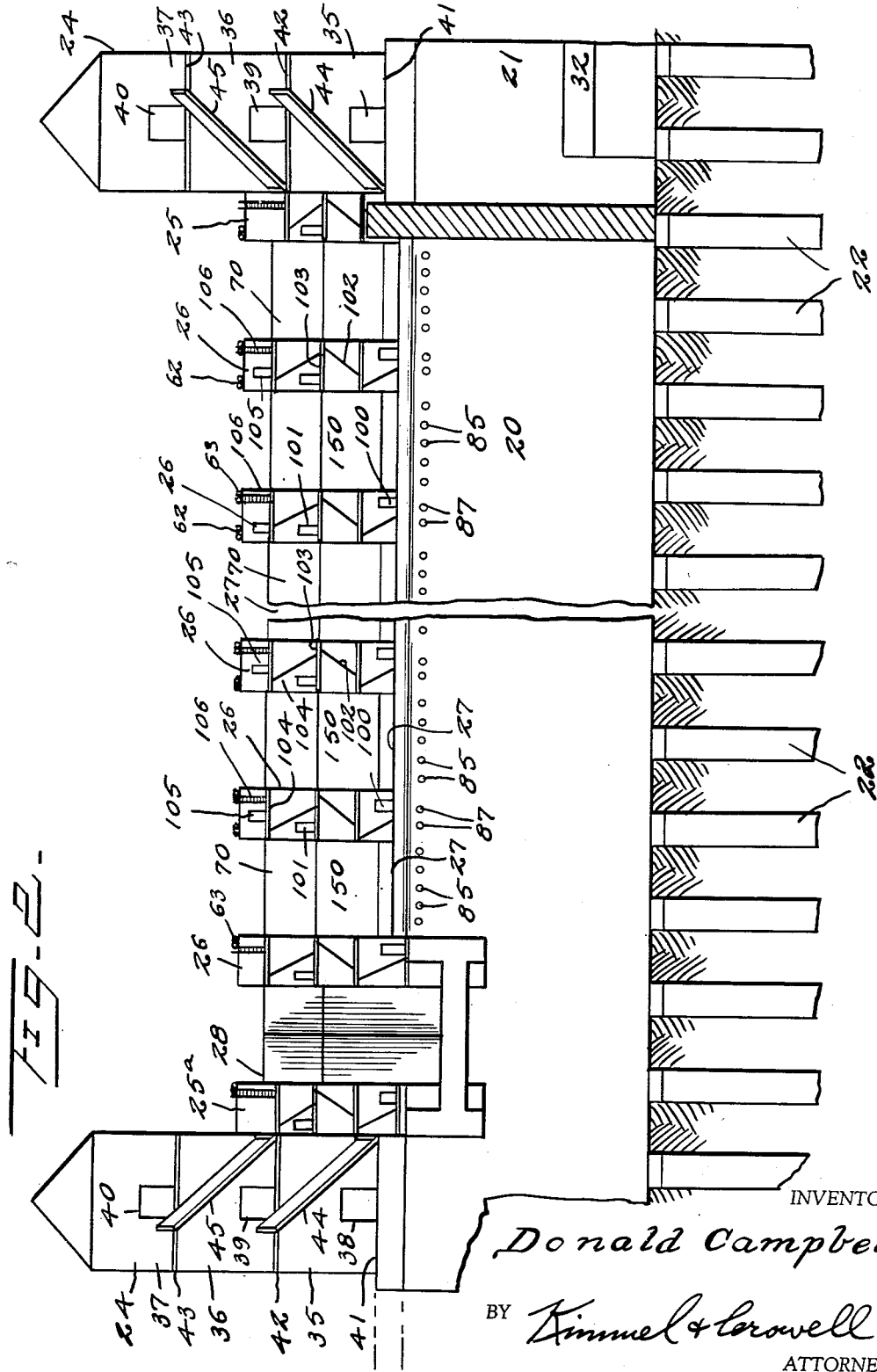

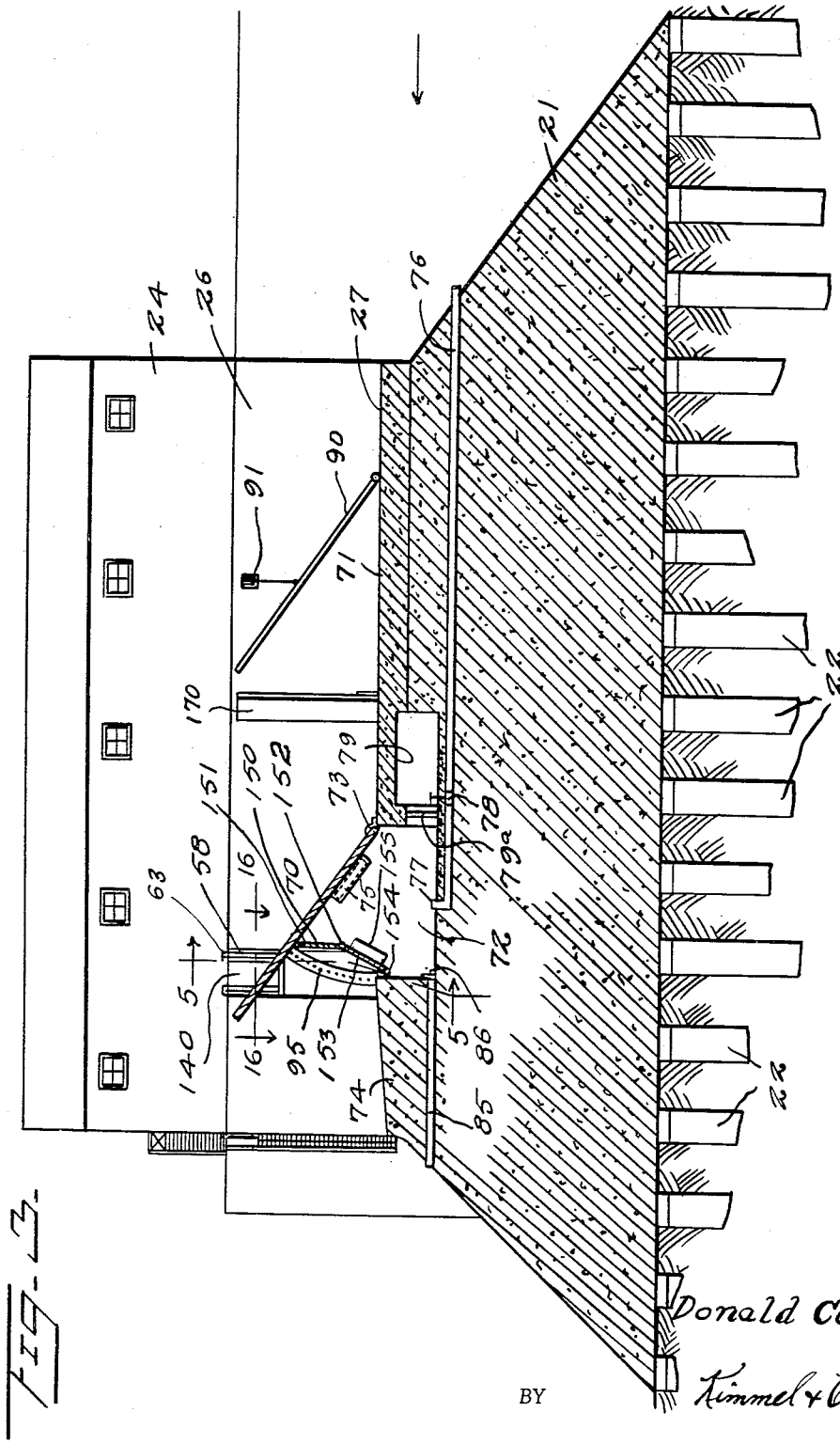

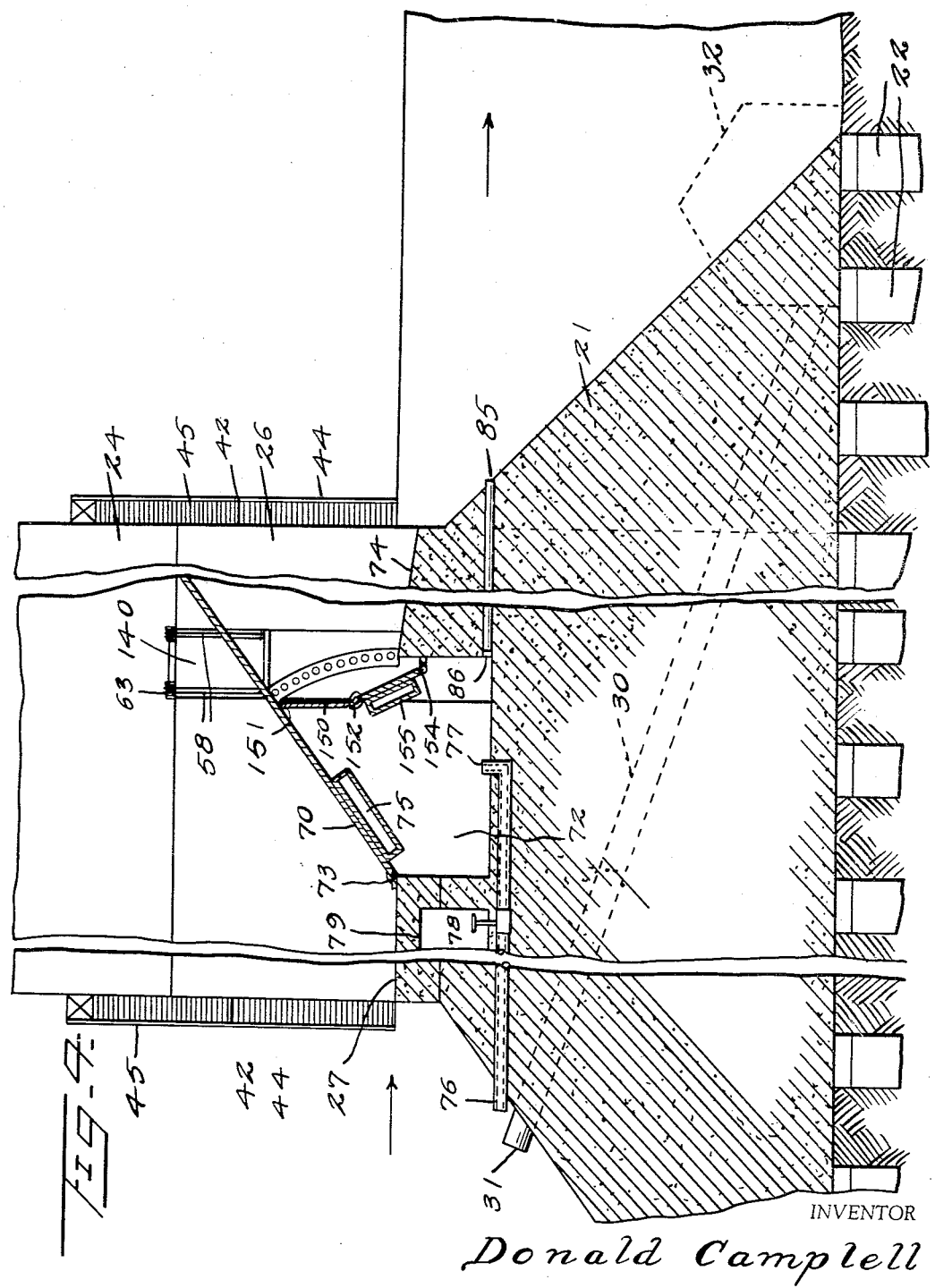

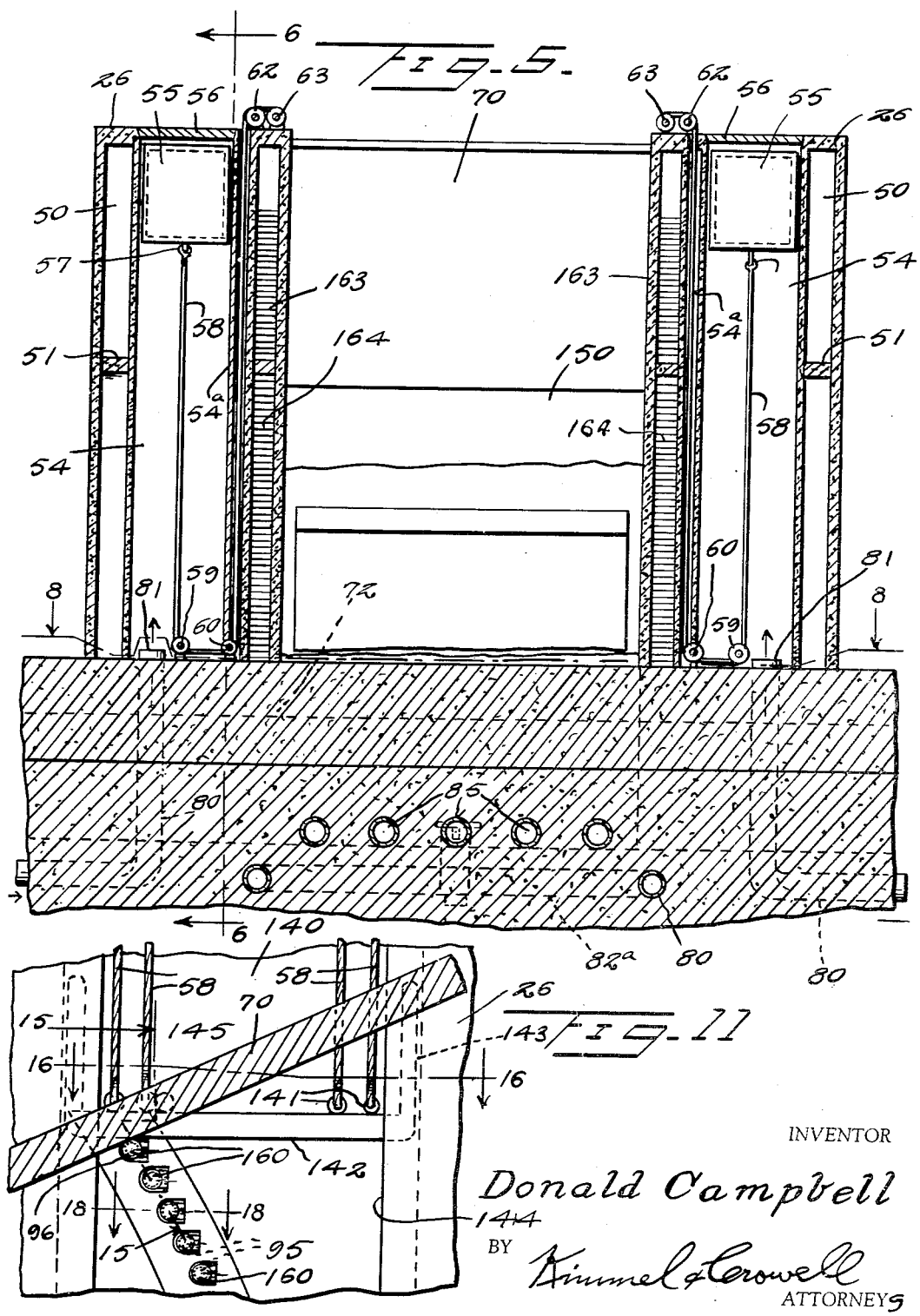

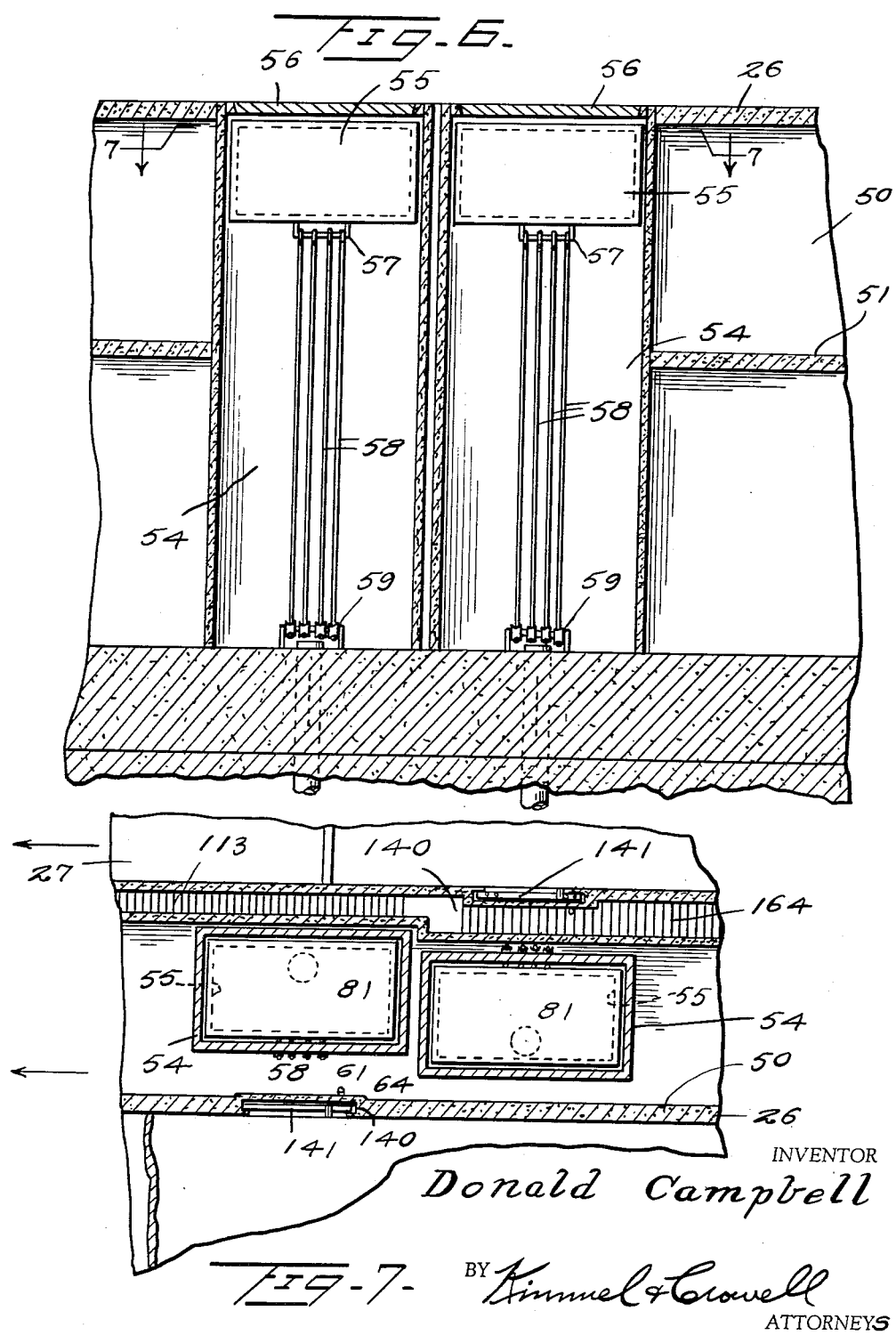

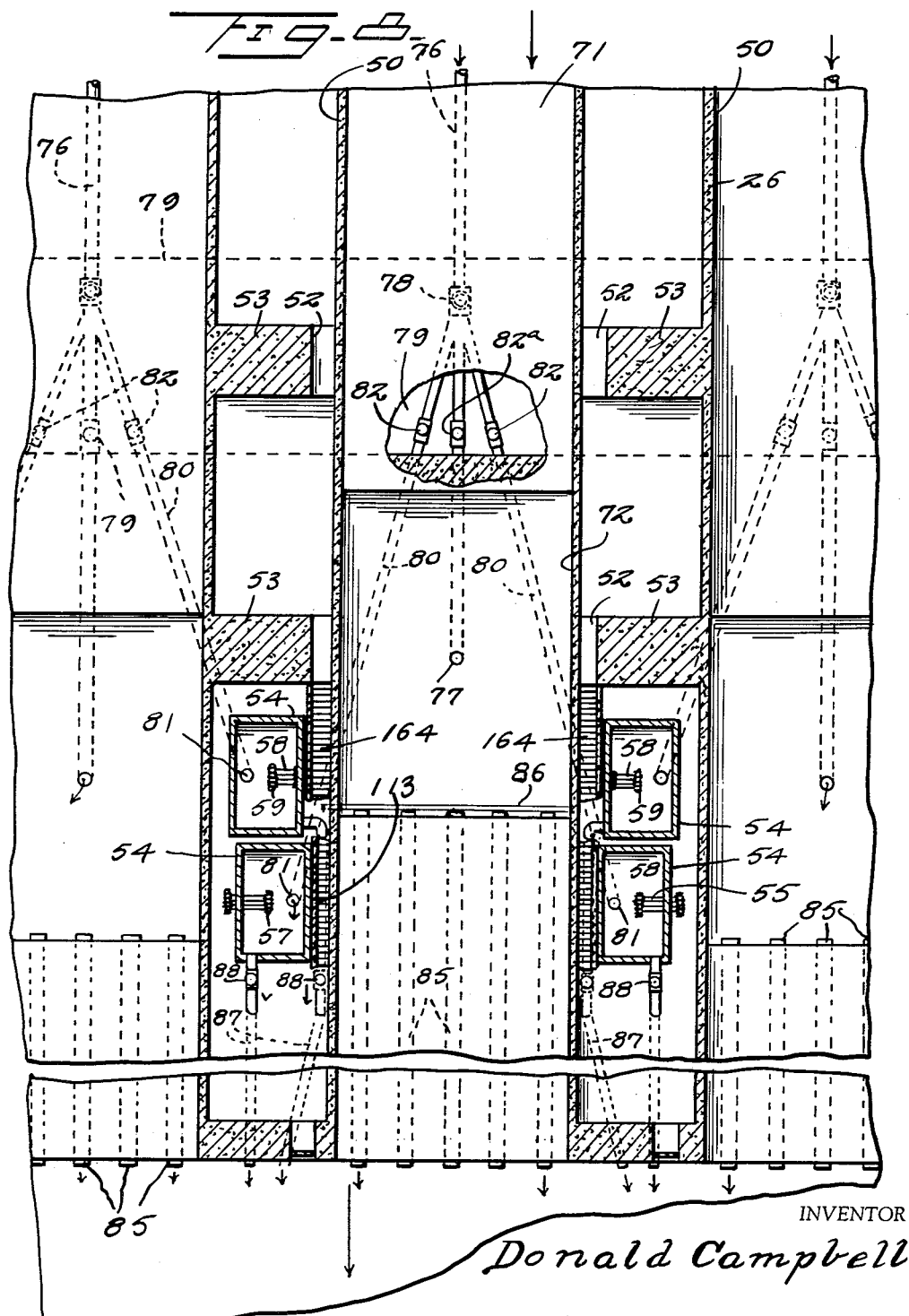

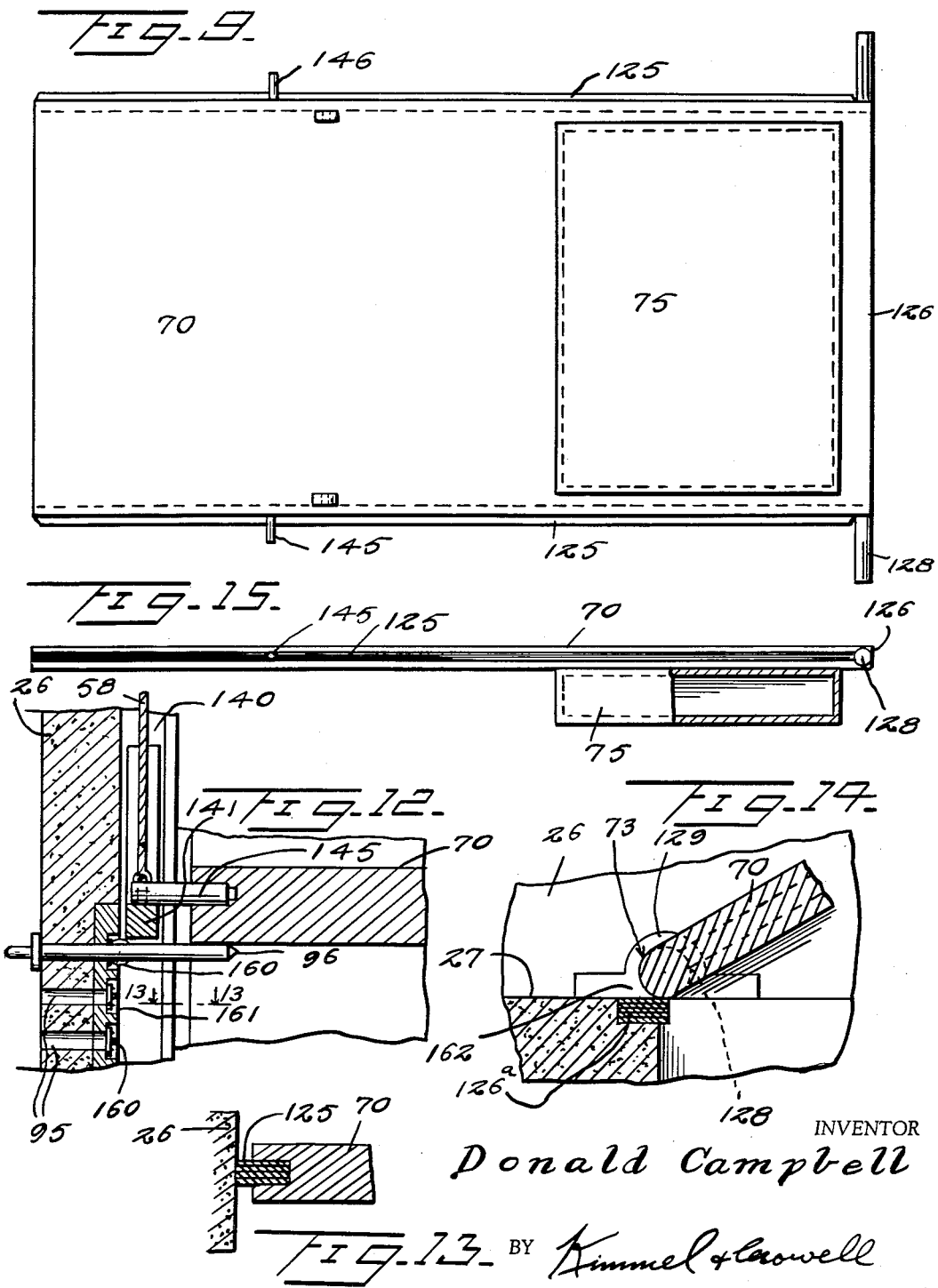

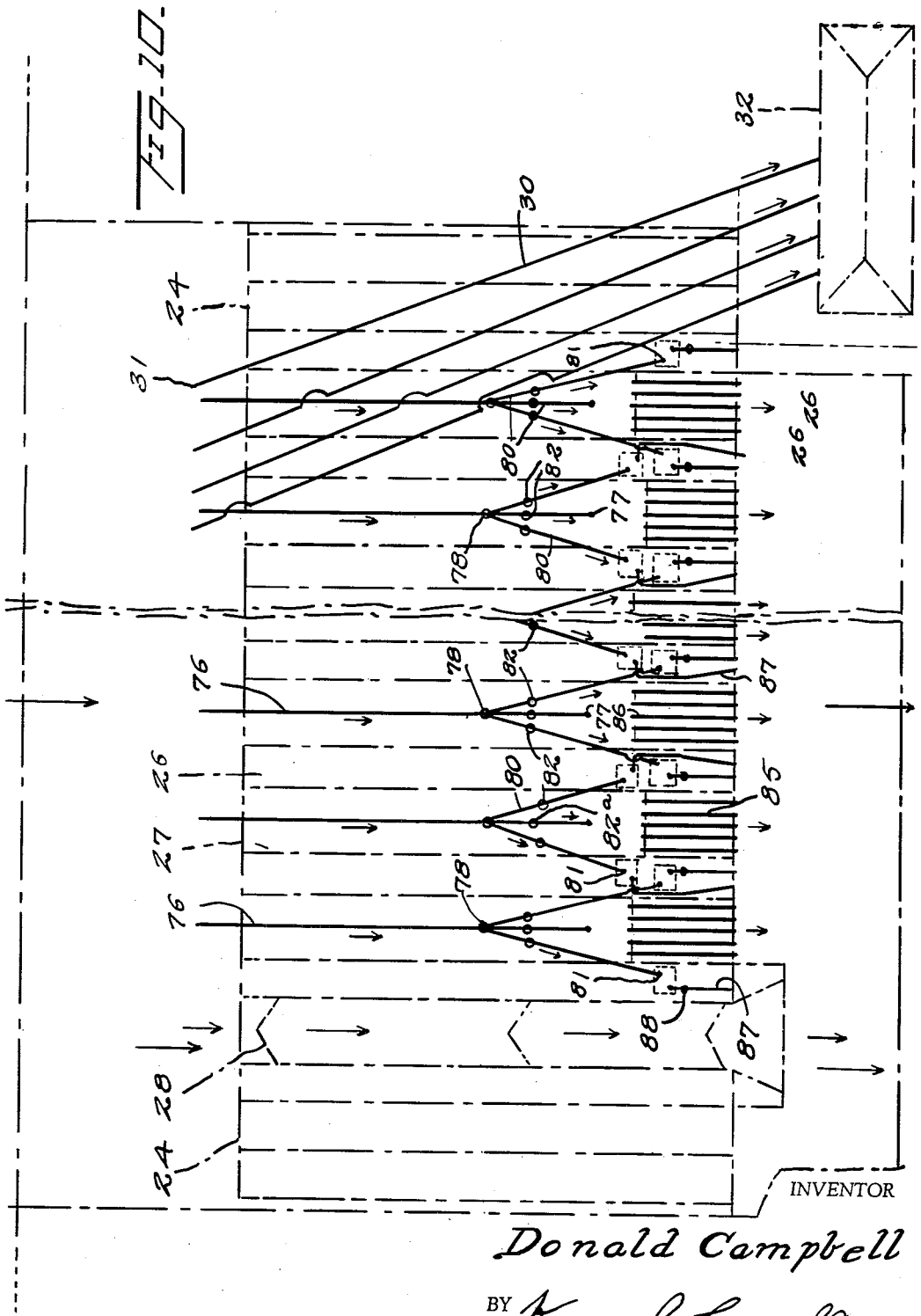

June 26, 1956 D. CAMPBELL 2,751,754
POWER DAM SLUICEWAY GATE
Filed Feb. 17, 1953 10 Sheets-Sheet 10
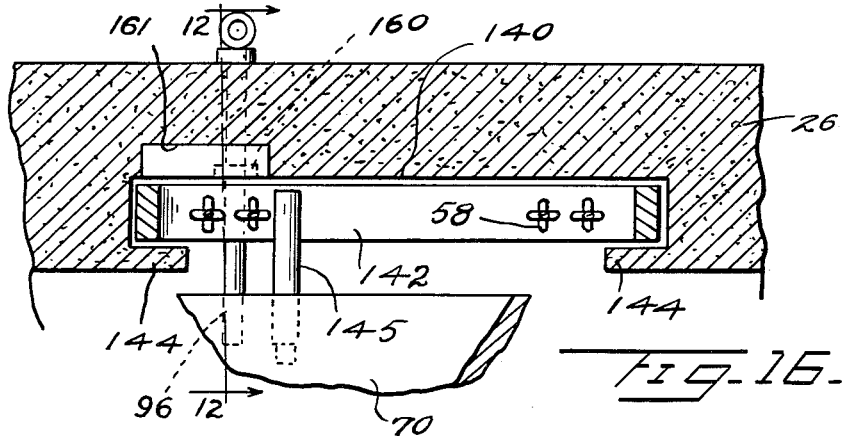
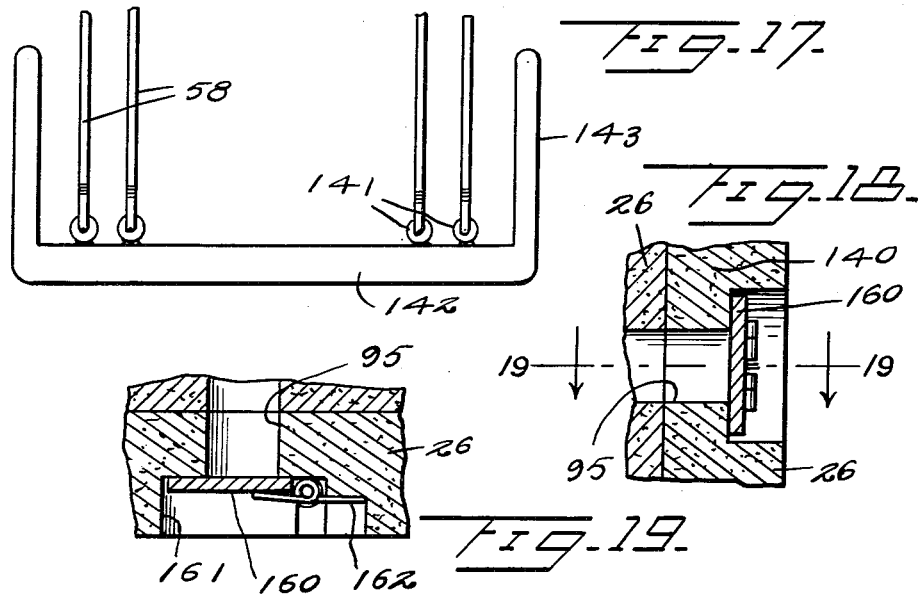
INVENTOR
*Donald Campbell*
BY *Kimmel & Crowell*
ATTORNEYS United States Patent Office 2,751,754
Patented June 26, 1956

2,751,754

POWER DAM SLUICEWAY GATE

Donald Campbell, Medford, Oreg.

Application February 17, 1953, Serial No. 337,283

4 Claims. (Cl. 61—27)

This invention relates to a power dam, and more particularly to such a dam basically adapted for a relatively low head of water.

A primary object of the invention is the provision of an improved dam construction characterized by a plurality of spaced piers having sluiceways therebetween, and pivotally mounted gates in the sluiceways whereby the relative level of the water held by the dam may be varied automatically in accordance with the water level.

An additional object of the invention is the provision of means whereby the gates may be readily raised and lowered about their respective pivots by means of water pressure.

A further object of the invention is the provision of means whereby the gates may be independently moved in order to provide one or more low level sluiceways if desired.

A more specific object of the invention is the provision of a dam including pivotally mounted gates in the sluiceways, having means whereby the rise and/or fall of the gates rotating about their pivots may be controlled and limited.

A further object of the invention is the provision of a dam having piers so arranged that ready access may be had to the interior thereof.

Another object of the invention is the provision of means including piping for introducing water into wells contained in the piers, which wells contain floats connected to the gates to assist raising the same.

An additional object of the invention is the provision of independent valve means for controlling the flow of water into each individual well, and means in the dam whereby ready access may be had to such individual valve means.

Still another object of the invention is the provision of tanks in the sluiceways whereby as the water rises, the inlet pipes being open, the gates may be lifted independently of the lifting means contained in the piers.

An additional object of the invention is the provision of gates of the above character, constructed of lightweight material, whereby a relative minimum of lift will be required to lift the same.

A further object of the invention is the provision of air tanks carried by the gates to assist in the lifting thereof.

A more specific object resides in the arrangement of cable connections between the floats contained in the piers and the gates, whereby the floats may effectively act to lift the gates.

A further specific object of the invention resides in the provision of water tight hinges and water tight sealing means extending between the gates and their adjacent piers, and the bottom of the gates and the sluiceways.

Still other objects reside in the combination of elements, arrangement of parts, and features of construction, all as will be more fully pointed out hereinafter, and shown in the accompanying drawings.

Still other objects will in part be obvious, and in part be pointed out hereinafter, and shown in the drawings, wherein:

In the drawings—

Figure 1 is a top plan view of one form of dam embodying features of the instant inventive concept, Figure 2 is an enlarged front elevational view, taken from the down-stream side of the dam of Figure 1, Figure 3 is an enlarged sectional view taken substantially along the line 3—3 of Figure 1, Figure 4 is an enlarged sectional view partially broken away, taken substantially along the line 4—4 of Figure 1, looking in the opposite direction of Figure 3, Figure 5 is an enlarged sectional view taken substantially along the line 5—5 of Figures 1 and 3, Figure 6 is a sectional view taken substantially along the line 6—6 of Figure 5, as viewed in the direction indicated by the arrows, Figure 7 is a sectional view taken substantially along the line 7—7 of Figure 6, as viewed in the direction indicated by the arrows, Figure 8 is a sectional view taken substantially along the line 8—8 of Figure 5, as viewed in the direction indicated by the arrows, certain concealed portions thereof being indicated in dotted lines, Figure 9 is an enlarged bottom plan view of one gate, Figure 10 is a schematic plan view of the dam, partially broken away, showing the arrangement of inlet and outlet pipes, Figure 11 is a fragmentary enlarged detailed view, partly in section, showing the relationship of the cables for the floats to the gates, Figure 12 is a sectional view taken along the line 12—12 of Figure 16, Figure 13 is an enlarged fragmentary sectional view taken along the line 13—13 of Figure 12, Figure 14 is an enlarged fragmentary sectional view taken along the line 14—14 of Figure 1, Figure 15 is a side view, partially in section, of the gate shown in Figure 9, Figure 16 is an enlarged sectional view taken along the line 16—16 of Figure 11, as viewed in the direction indicated by the arrows, Figure 17 is an enlarged constructed detail showing an element of the gate operating mechanism, Figure 18 is an enlarged sectional view taken along the line 18—18 of Figure 11, as viewed in the direction indicated by the arrows, Figure 19 is a sectional view taken along the line 19—19 of Figure 18, as viewed in the direction indicated by the arrows, Similar reference characters refer to similar parts throughout the several views of the drawings.

Having reference now to the drawings in detail, and more particularly to Figures 1, 2, and 3, the dam of the instant invention generally indicated at 20, is comprised of a main body portion 21, of a desired height, which may if desired be seated on piles 22 driven down to bed rock in order to insure suitable strength. At each end of the dam there is located a building 24, which may incorporate quarters for the dam crew, as well as maintenance machinery and operative machinery, or be utilized for any other desired purpose.

Positioned adjacent each building 24 are piers 25 and 25a respectively, and at spaced intervals across the top of the dam are positioned elongated piers 26, the latter piers being substantially identical. Obviously the dam may be made of any desired height and width, but the piers are preferably relatively long for reasons that will appear hereinafter.

Between the piers 26 are positioned sluiceways 27, and between one of piers 25 and its adjacent pier 26 is a corresponding sluiceway 27, while between the other of the piers 25a and its adjacent pier 26 there is located a lock system generally indicated at 28.

From the face of the up-river side of the dam at a point adjacent its upper level, pipes 30 having openings 31 extend downwardly to a power house 32, preferably located at a substantially lower level on the down-river side of the dam in order to provide a high operating head of water. Power house 32 contains any desired type of conventional hydro-electric turbines or similar machinery.

Referring now in detail to the buildings 24 it will be seen that these are comprised of three levels 35, 36, and 37, each of which is provided with an access door 38, 39 and 40 respectively, on the down-stream side of the dam, each access door being provided with a landing or platform 41, 42, and 43 respectively, together with outside stairways 44 and 45, communicating the platforms. It will thus be understood that ready access may be had to any floor of the dam houses or buildings from the exterior thereof as may be necessary. As previously stated, these dam buildings may contain any desired machinery, storage facilities, living quarters, or be utilized for any other desired purposes.

Referring now in detail to the piers 26, it will be seen that as best shown in Figures 5, 6, 7, and 8, each is comprised of a hollow shell 50 within which is located a second floor 51, passageways 52 being provided through reinforcing partitions 53. Each of piers 26 contains two water tight wells 54 within which are positioned float tanks 55, a removable top section 56 providing access to the interior of wells 54 when necessary. Preferably the wells 54 are rectangular in cross section and the floats are dimensioned as to move vertically therewithin with very little side play.

Each float 55 is provided with a transverse bar 57 at its base to which are secured a plurality of cables 58. The cables 58 extend downwardly to a plurality of pulleys 59 mounted in the bottom of the tank and thence transversely, as best shown in Figure 5, through openings 60 in the bottom of wells 54 to pulleys 61 located in the auxiliary wells 54a exteriorly of and parallel to the wells 54. The cables 58 then extend upwardly to pulley 62 located on top of the piers and thence horizontally to pulleys 63. Cables 58 then extend downwardly into a vertical recess or channel 140 in the outer face of pier 26. The ends of the cables 58 are secured to eyes 141 carried by an elongated weight 142 extending transversely across channel 140 provided with upstanding guide arms 143 to prevent disalignment of weight 142 in channel 140 (see Figs. 11 and 17). Flanges 144 extend inwardly from the sides of channel 140 to retain weight 142 therein (see Fig. 16).

Gates 70, pivotally mounted in sluiceways 27, and to be more fully described hereinafter, are provided with transversely extending lugs 145 on their side edges (see Figure 12) which extend into channels 140 and overlie weights 142 in order that raising of float tanks 55 will cause a lifting pressure to be exerted thereon to raise the gates 70 in a manner and for a purpose to be more fully described hereinafter. These gates may have a width of from 100 to 500 feet or as wide as may be required within the limits of its structural strength.

It may here be pointed out that channels 140 are of sufficient width and weights 142 of sufficient length to allow lateral movement of lugs 145 to an extent commensurate with the radius of arc of its pivotal movement.

Having reference now to sluiceways 27 between piers 26, and having more particular reference to Figures 3, 4, and 5, it will be seen that each is comprised of a relatively flat base portion 71 between adjacent piers 26, which portion terminates in a tank or cellar 72 over which is pivotally mounted, as by means of a water tight pivotal connection 73, the gate 70. At the opposite end of tank 72 there is positioned an inclined spillway 74 which empties adjacent the top of the body 21 of the dam. Gate 70 is provided on its underside with air tanks 75 and when in lowered position lies flush with the bottom surface 71 of the sluiceway, with the air tank 75 within water tank 72.

A sealing means for the space between gates 70 and wells 72 when a gate 70 is in raised position is also provided. This takes the form of a sealing sheet or plate 150 connected by a water tight pivot 151 to the underside of gate 70 and by a second water tight pivot 152 to a second plate 153 which in turn is connected by a water tight pivot 154 to a point interiorly of and slightly below the top of well 72, so that gate 70 may lie flat along the bottom of sluiceway 26 when the gate is lowered. A float tank 155 is positioned on the underside of plate 153 to assist in raising gate 70 when the water level in well 72 rises.

Figure 9 discloses an enlarged detailed view of one of the gates 70 and shows the gate provided with a flexible rubber sealing gasket 125 extending between the edges of the gate and the adjacent piers (see also Fig. 13 and Fig. 15), as well as the flexible rubber sealing flap 126 surrounding the pivotal mounting 73 of gate 70, mounting 127 being comprised of suitable pivots 128 seating in journals 129 in the side walls of the adjacent piers and a sealing gasket 126a seated in the bottom of sluiceway 27. A similar gasket is provided on the sides of plates 150 and 153.

A pipe 76 extends from a point below the water level on the up-stream side of the dam to a inlet 77 in the bottom of tank 72 and is provided with a main control valve 78 which is located in a passageway 79 extending transversely the full width of the dam, whereby ready access may be had to any of valves 78 from the passageway 79. An access door 79a is provided from passageway 79 to each tank or cellar 72. As best shown in Figure 8, branch pipes 80 diverge from inlet pipe 76 and extend to suitable inlets 81 in the bottoms of wells 54. Control valves 82 are provided for the pipes 80 and are similarly controlled from passageway 79, as is a supplemental control valve 82a for center pipe 76. It will thus be seen that the admission of water to any one of the tanks 72, as well as any one of the wells 54, may be independently controlled and that thus each of the gates 70 may be correspondingly individually controlled.

Outlet pipes 85 extend through the bottom of spillway 74 and empty adjacent the top of the body 21 of the dam. Suitable valves 86 which may be controlled in any desired manner from the piers independently control the outlets 85. Similar outlets 87 are provided from the wells 54 and are controlled by means of valves 88 which may be in turn controlled from within the piers.

The construction of the pier 25 is substantially identical with that of the piers 26, with the exception of the fact that it contains only one well 54 since there is only one side of one gate associated therewith. The pier 25a being adjacent lock 28, will obviously require no wells and floats.

Each sluiceway is also provided with a pivotally mounted grill 90 for the purpose of stopping debris and protecting gates 70. Any desired source of power, such as an electric motor 91 or the like, located in the adjacent pier may be utilized to raise and lower grills 90.

Means are provided for controlling the maximum and minimum raising and lowering of the gates and take the form of an arcuate bar 95 with a series of bores or apertures 95a and a plurality of passages 26a which extend through the wall of pier 26, the radius of arc corresponding to the arc of rotation of gate 70 in the channel 140 of each pier adjacent each gate. Suitable pins 96 are insertable from the interior of the pier in any selected aperture and may be positioned either above the gate to control the maximum raising thereof, or below the gate to control the minimum lowering, or if desired, on both sides to fix the position of the gate regardless of the height of the water.

Means are also provided for closing those bores not in use and take the form of resilient sealing flap valves 160 set in recess 161 in channel 140 and normally biased as by means of spring 162 towards bore closing position, insertion of pin 96 from the interior of the bores 95 serving to force open valves 161 (see Figs. 11, 12, 16, 18, and 19). Access is provided to the various bores 95 by means of interiorly positioned stairways 163 and 164 in the hollow interior of piers 26.

In the operation of the device it will be understood that when the water level on the up-stream side of the dam is below the floor 71 of the sluiceways, gates 70 may be opened to their maximum extent and allowed to lie flat. As the water level rises if it is desired to close the sluiceways, valves 78 and 82a are opened, while valves 86 and 88 are closed and water is admitted into tank 72. As the water level rises water enters tank or cellar 72 and with the assistance of tank 75 raises gate 70 in accordance with the head of water above the dam. As the head rises additional lifting power may be required in which event valves 82 may be opened to permit water to enter wells 54 and by the lifting action effected on tank 55 raise weight 141 to exert lifting force against pins 145 to aid in raising gates 70.

If it is desired to lower the gates to allow water to pass through the sluiceways, valve 78 and valves 82 and 82a may be closed and outlet valves 86 and 88 correspondingly opened to permit the out-flow of water from wells 54 and tanks 72.

As shown in Figure 2, the down-stream side of each pier 26 is provided with an access door 100 in the base thereof, an access door 101 into the second floor thereof, suitable stairways 102 extending from the bottom of the pier to the second floor landing 103 and thence to an additional landing 104, a third access door 105 being provided if desired. Suitable ladders 106 extend from the topmost landing 104 to the top of each pier in order to provide access thereto when necessary.

Having reference now particularly to Figure 10, the arrangement of the pipes is shown in detail. It will be seen that each inlet pipe 76 is positioned substantially centrally of the sluiceway and extends to a centrally positioned outlet 77, each located in a tank 72. The diverging pipes 80 lead respectively to a well 54 in an adjacent pier 26, which wells contain the floats 55. Thus, the two wells 54 in each pier are each served by a separate main inlet pipe 76. As previously pointed out, each spillway is provided with a plurality of outlet pipes 85, while each well is provided with an individual outlet pipe 87 each having an individual control valve.

From the foregoing it will now be seen that there is herein provided an improved dam construction which may be made of any desired height or width and have incorporated therein any desired number of sluiceways or piers, and which is extremely versatile in operation in that the level of the water on the up-stream side of the dam may be controlled and varied in accordance with the position of the individual gates and in which any one or more gates may be automatically operated in accordance with the head of water or opened independently of the others to provide a spillway and prevent overflow in the event of excessive high water.

It will further be seen that the dam constructed in accordance with the instant invention may be advantageously utilized for a wide variety of purposes and as a source of power for irrigation, hydro-electric power, or any desired purpose.

It will also be seen that there is herein provided a dam which accomplishes all of the objects of this invention and many others including advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What I claim is:

1. In a dam construction including a plurality of elongated, hollow, substantially rectangular piers disposed in substantially spaced parallel relation, each pair of adjacent piers having confronting sidewalls, a sluiceway between each of said confronting sidewalls, a substantially rectangular gate disposed between each pair of said confronting sidewalls, means pivotally connecting one end of said gate on said sluiceway with its oppositely disposed end extending upwardly at an inclined angle with respect to said sluiceway, each of said piers having a well and auxiliary wells being in communication with each other against their respective lower ends, pulleys mounted on the bottoms of each of said wells, pulleys mounted on the top of each of said piers adjacent each of said wells, a float tank in each of said wells, cables having one of their ends connected with each of said float tanks and trained around said pulleys and over each pair of confronting sides of said piers, a weight of fixed value connected with the other ends of said cables, a pin projecting laterally from each side of said gate and engaging on said weight and means for introducing water into and discharging water from said wells to raise and lower said float tanks whereby said weights are raised and lowered to effect the raising and lowering of said gate.

2. In a dam construction as defined in claim 1, and means secured to said confronting pairs of walls and extending therebetween for limiting the degree of movement of said free end of said gate.

3. In a dam construction as defined in claim 1, and a well for each of said sluiceways disposed below each of said gates, means for introducing water into and discharging water from said last named wells, and an air float chamber fixedly secured to the lower side of each of said gates for movement therewith downwardly for projection into said last named wells whereby introduction of said water into said last named wells will surround said air chambers so that the buoyancy thereof will assist in raising said gates when the water in said first wells is discharged therefrom.

4. In a dam construction as defined in claim 3, and means sealing said wells in said sluiceways from the entry of water from said sluiceways thereinto.

References Cited in the file of this patent

UNITED STATES PATENTS

| | | |
|---|---|---|
| 419,287 | Scaife | Jan. 14, 1890 |
| 646,767 | Stoddart | Apr. 13, 1900 |
| 1,039,072 | Edge | Sept. 17, 1912 |
| 1,081,707 | Valentine | Dec. 16, 1913 |
| 1,507,087 | Rankin | Sept. 2, 1924 |
| 2,074,610 | Jermar | Mar. 23, 1937 |
| 2,616,266 | Hale | Nov. 4, 1952 |

FOREIGN PATENTS

| | | |
|---|---|---|
| 139,909 | Austria | of 1934 |
| 574,037 | Great Britain | Dec. 18, 1945 |